United States Patent [19]

Woo

[11] Patent Number: 5,886,677
[45] Date of Patent: Mar. 23, 1999

[54] FRAME SIZE REGULATING CIRCUIT

[75] Inventor: Sang-Yean Woo, Kyeonggi-Do, Rep. of Korea

[73] Assignee: Daewoo Electronics Co., Ltd., Seoul, Rep. of Korea

[21] Appl. No.: 772,786

[22] Filed: Dec. 24, 1996

[30] Foreign Application Priority Data

Dec. 27, 1995 [KR] Rep. of Korea ................... 1995 58786

[51] Int. Cl.⁶ ...................................................... G09G 1/06
[52] U.S. Cl. ................................................................ 345/13
[58] Field of Search .................................. 345/13, 14, 22, 345/213, 10, 20; 348/380, 476, 465, 471

[56] References Cited

U.S. PATENT DOCUMENTS

| | | | |
|---|---|---|---|
| 3,643,251 | 2/1972 | Kolb et al. | 345/14 |
| 5,216,412 | 6/1993 | Gawell et al. | 345/14 |
| 5,550,556 | 8/1996 | Wu et al. | 345/14 |
| 5,565,897 | 10/1996 | Kikinis et al. | 345/13 |

FOREIGN PATENT DOCUMENTS 8-228301  9/1996  Japan .

Primary Examiner—Chanh Nguyen
Assistant Examiner—John Suraci
Attorney, Agent, or Firm—Beveridge, DeGrandi, Weilacher & Young, LLP

[57] ABSTRACT

A frame size regulating circuit capable of simultaneously controlling horizontal and vertical sizes to simply vary a frame size includes a key matrix formed by plural keys for simultaneously varying horizontal and vertical sizes of a frame, and a microprocessor which generates plural pulse-width modulation signals for determining the frame size according to an externally-supplied horizontal sync signal and vertical sync signal and scans a key selected in the key matrix to generate plural frame size variation signals. A frame size determinator part provides a horizontal size determination signal of DC component and a vertical size determination signal of DC component according to the plurality of pulsewidth modulation signals, and a frame size variable part varies magnitudes of the horizontal size determination signal of DC component and of the vertical size determination signal of DC component according to the plural frame size variation signals to vary the size of the frame. Thus, the frame size is simply varied by the key selection of the key matrix.

11 Claims, 4 Drawing Sheets

FRAME SIZE REGULATING CIRCUIT

BACKGROUND OF THE INVENTION

1. Field of the Invention

The present invention relates to a monitor, and more particularly to a frame size regulating circuit for simultaneously controlling horizontal and vertical sizes of a frame.

2. Description of the Prior Art

Horizontal and vertical sizes of a frame displayed on a CRT of a monitor are determined by externally-supplied horizontal and vertical sync signals.

A conventional frame size regulating circuit of such kind is as illustrated in FIG. 1. Referring to FIG. 1, a reference numeral 1 denotes a microprocessor for providing pulsewidth modulation signals PWM1 and PWM2 for controlling horizontal and vertical sizes in accordance with input horizontal and vertical sync signals Hs and Vs; and 2 is a horizontal size determinator part for shaping and amplifying pulsewidth modulation signal PWM1 to produce a horizontal size determination signal of DC component. A reference numeral 3 denotes a mixer for overlapping the horizontal size determination signal with an externally-supplied distortion correction signal GD, and providing the overlap signal to an unshown diode modulator. A reference numeral 4 denotes a vertical size determinator part for shaping pulsewidth modulation signal PWM2 to provide a vertical size determination signal of DC component; and 5 is a deflection circuit for overlapping the vertical size determination signal with horizontal and vertical sync signals Hs and Vs to provide a deflection signal of triangular waveform.

Horizontal size determinator part 2 is formed by a shaping part 2a for shaping pulsewidth modulation signal PWM1 and an amplifying part 2b for amplifying a DC voltage of shaping part 2a.

Shaping part 2a includes a resistor 21 for biasing pulsewidth modulation signal PWM1, and resistors 23 and 25 which are serially connected with each other for distributing an externally-supplied DC power source Vcc and are connected to the output side of resistor 21 for overlapping a distribution voltage with an output voltage of resistor 21. Also, a resistor 27 biases the overlap signal and a capacitor 29 smooths a bias signal of resistor 27 for providing the DC voltage.

Meantime, amplifying part 2b includes an amplifier 31 for amplifying the DC voltage of shaping part 2a, and resistors 33 and 35 respectively connected between the output side and between the (−) port of amplifier 31 and the (−) port of amplifier 31 and a ground for determining an amplification factor of amplifier 31.

Vertical size determinator part 4 is formed by resistors 41, 43, 45 and 47 and a capacitor 49 which are identical to shaping part 2a of horizontal size determinator part 2.

When horizontal and vertical sync signals Hs and Vs are supplied into microprocessor 1 in the conventional frame size regulating circuit as described above, microprocessor 1 generates pulsewidth modulation signals PWM1 and PWM2 corresponding to horizontal and vertical sync signals Hs and Vs, in which pulsewidth modulation signal PWM1 is supplied to shaping part 2a of horizontal size determinator part 2.

Shaping part 2a shapes pulsewidth modulation signal PWM1 to provide the DC voltage which is in turn supplied to amplifying part 2b. Then, amplifying part 2b amplifies the DC voltage to provide the horizontal size determination signal of DC component.

The operation of horizontal size determinator part 2 which provides the horizontal size determination signal of DC component from pulsewidth modulation signal PWM1 will be described in more detail with reference to FIG. 2. Pulsewidth modulation signal PWM1 is supplied to resistor 21 of shaping part 2a, and resistor 21 biases pulsewidth modulation signal PWM1.

DC power source Vcc is supplied to resistors 23 and 25 which distribute DC power source Vcc and overlap the distribution voltage with the bias signal of resistor 21. The overlap signal is supplied to resistor 27 which biases the overlap signal. The bias signal of resistor 27 is supplied to capacitor 29 which then smooths the bias signal to produce the DC voltage.

The DC voltage is supplied to the (+) port of amplifier 31 in amplifying part 2b, and amplifier 31 amplifies the DC voltage to provide the horizontal size determination signal of DC component. At this time, the amplification factor of amplifier 31 is determined by resistors 33 and 35.

The horizontal size determination signal is supplied to mixer 3 which in turn overlaps the horizontal size determination signal with distortion correction signal GD. The resulting overlap signal is supplied to the diode modulation.

On the other hand, pulsewidth modulation signal PWM2 of microprocessor 1 is supplied to vertical size determinator part 4. Then, vertical size determinator part 4 shapes pulsewidth modulation signal PWM2 to generate the vertical size determination signal of DC component. Here, the procedure of generating the vertical size determination signal of DC component from pulsewidth modulation signal PWM2 is the same as executed by shaping part 2a of horizontal size determinator part 2 in which the DC voltage is generated from pulsewidth modulation signal PWM1.

Thus, the vertical size determination signal of DC component is supplied to deflection circuit 5 which overlaps the vertical size determination signal of DC component with the horizontal and vertical sync signals Hs and Vs. Thereafter, the overlap signal is oscillated to generate the deflection signal of triangular waveform.

In the frame size regulating circuit as described above, however, the horizontal and vertical sizes of the frame is determined at the initial time in accordance with the horizontal sync signal and vertical sync signal, and the initially-determined frame size cannot be simultaneously reduced nor enlarged as desired.

SUMMARY OF THE INVENTION

Therefore, it is an object of the present invention to provide a frame size regulating circuit of a monitor capable of simultaneously enlarging or reducing a frame size to have an optional size by a user.

To achieve the above object of the present invention, a frame size regulating circuit includes a key matrix formed by a plurality of keys for simultaneously varying horizontal and vertical sizes of a frame, and a microprocessor which generates a plurality of pulsewidth modulation signals for determining the frame size in accordance with an externally-supplied horizontal sync signal and vertical sync signal and scans a key selected in the key matrix to generate a plurality of frame size variation signals. Also, a frame size determinator part provides a horizontal size determination signal of DC component and a vertical size determination signal of DC component in accordance with the plurality of pulsewidth modulation signals, and a frame size variable part varies magnitudes of the horizontal size determination signal of DC component and of the vertical size determination signal of DC component in accordance with the plurality of frame size variation signals to vary the size of the frame.

According to a preferred embodiment of the present invention, the microprocessor provides the plurality of pulsewidth modulation signals in accordance with frequencies of the horizontal sync signal and vertical sync signal, and the plurality of pulsewidth modulation signals are supplied to the frame size determinator part. Then, the frame size determinator part determines the magnitudes of the DC voltage of the horizontal size determination signal and of the DC voltage of the vertical size determination signal. The plurality of frame size variation signals from the microprocessor in accordance with the key signal received via the key matrix are supplied to the frame size variable part which in turn varies the magnitudes of the DC voltage of the horizontal size determination signal and of the DC voltage of the vertical size determination signal in accordance with the plurality of frame size variation signals, thereby reducing or enlarging the frame size. Consequently, the frame size determined by the frame size determinator part can be optionally enlarged or reduced in accordance with the selection of a user.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A frame size regulating circuit of a monitor according to the present invention will be described in detail with reference to FIGS. 3 and 4.

Figure 1:
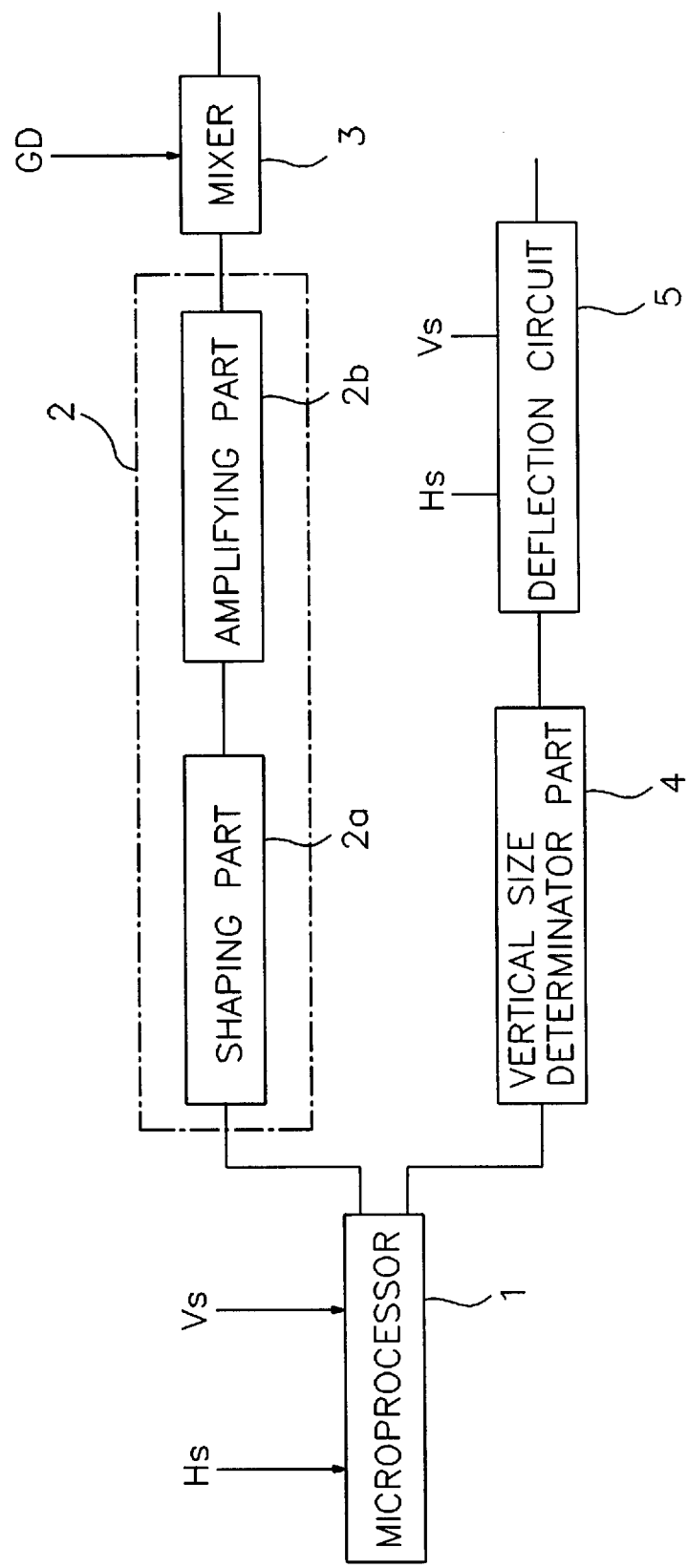
FIG. 1 is a block diagram showing a construction of a conventional frame size regulating circuit.
Figure 2:
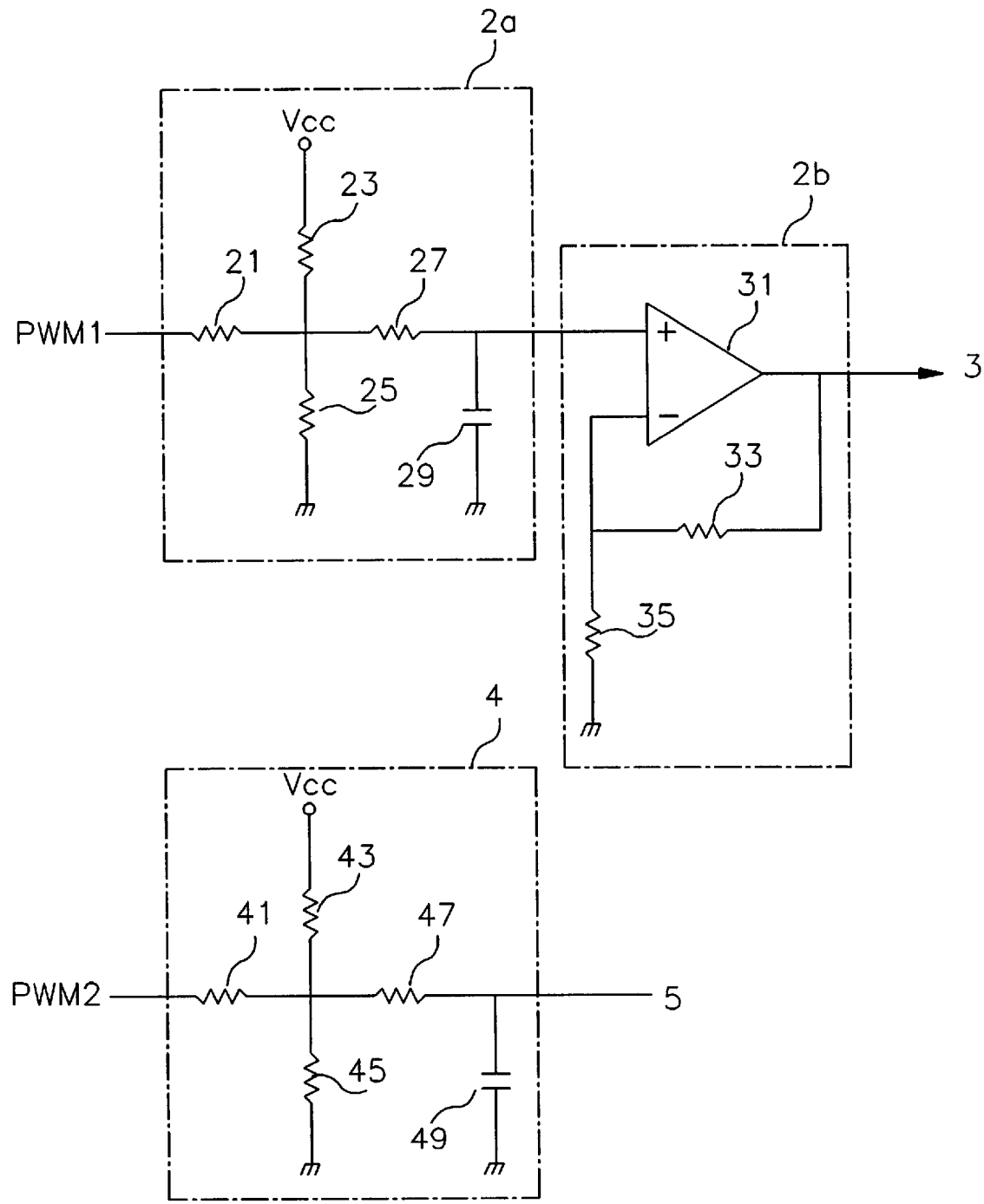
FIG. 2 is a view showing the construction of the frame size regulating circuit of FIG. 1 in detail.
Figure 3:
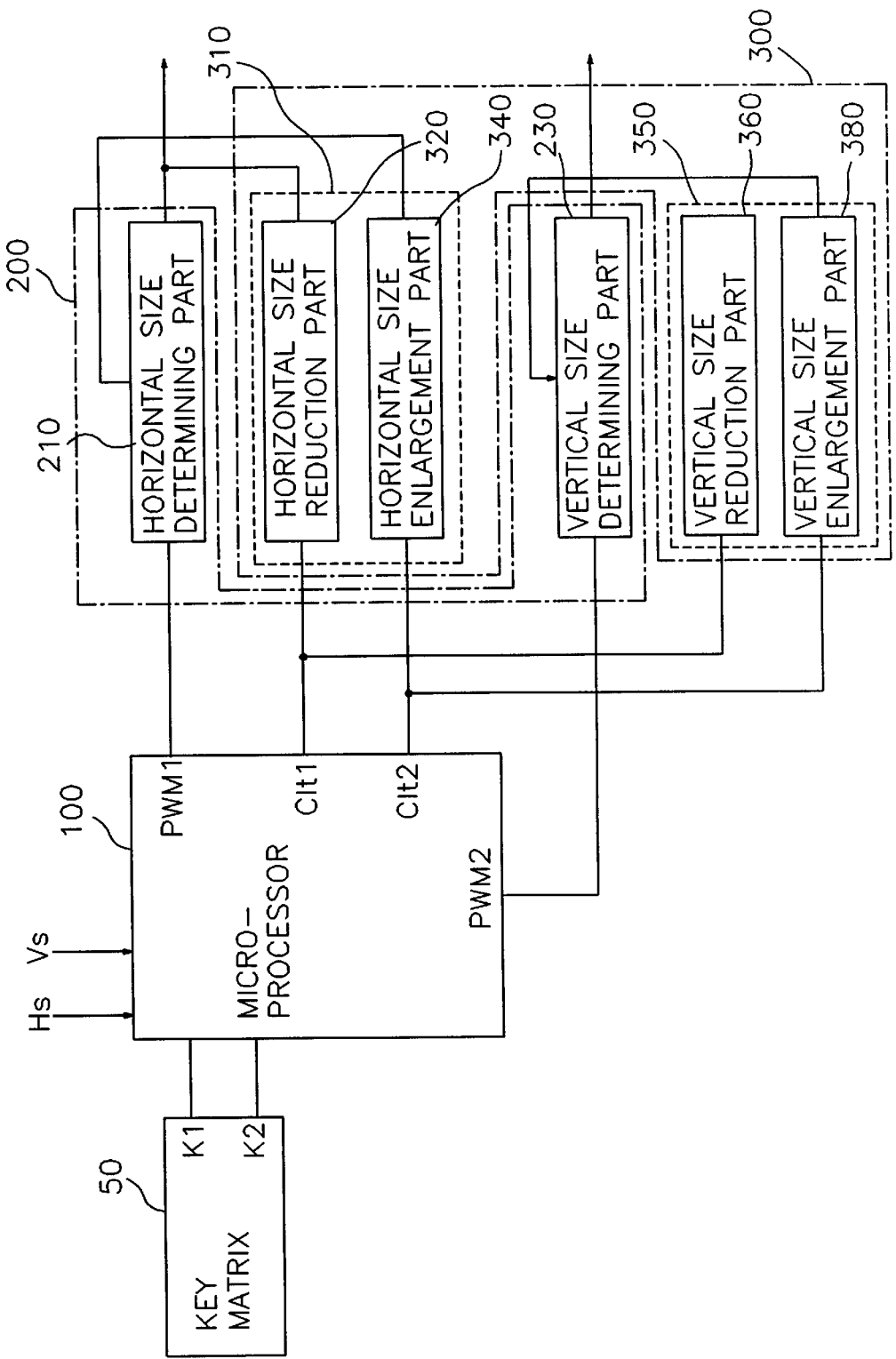
FIG. 3 is a block diagram showing a construction of a frame size regulating circuit according to the present invention.

FIG. 3 is a block diagram showing a construction of the frame size regulating circuit according to the present invention. In FIG. 3, a reference numeral 50 denotes a key matrix furnished with a plurality of keys for selecting to vary a frame size; and 100 is a microprocessor which generates pulsewidth modulation signals PWM1 and PWM2 for determining the frame size in accordance with horizontal and vertical sync signals Hs and Vs and scans keys K1 and K2 selected by key matrix 50 for producing a plurality of frame size variation signals Clt1 and Clt2 corresponding to key signals. A reference numeral 200 denotes a frame size determinator part for shaping plurality of pulsewidth modulation signals PWM1 and PWM2 to produce a vertical size determination signal and a horizontal size determination signal of DC components. A reference numeral 300 denotes a frame size variable part for varying the magnitudes of the vertical size determination signal and horizontal size determination signal of DC components to simultaneously reducing or enlarging the vertical and horizontal sizes.

Here, frame size determinator part 200 is formed by a horizontal size determining part 210 which shapes first pulsewidth modulation signal PWM1 among the plurality of pulsewidth modulation signals to generate a DC voltage and amplifies the DC voltage to provide the horizontal size determination signal of DC component. In addition, a vertical size determining part 230 is included in frame size determinator part 200 so as to shape second pulsewidth modulation signal PWM2 among the plurality of pulsewidth modulation signals, thereby providing a DC voltage as the vertical size determination signal of DC component.

Also, frame size variable part 300 includes a horizontal size variable part 310 which regulates the magnitudes of the DC voltage of horizontal size determining part 210 and of the DC voltage of vertical size determining part 230 to regulate the horizontal size in accordance with plurality of frame size variation signals Clt1 and Clt2. In addition, a vertical size regulating part 350 is provided thereto for regulating the magnitudes of the DC voltage of horizontal size determining part 210 and of the DC voltage of vertical size determining part 230 in accordance with plurality of frame size variation signals Clt1 and Clt2, thereby regulating the vertical size.

Horizontal size variable part 310 is formed by a horizontal size reduction part 320 for reducing the magnitude of the DC voltage to decrease the horizontal size in accordance with frame size reduction signal Clt1 among the plurality of frame size variation signals, and a horizontal size enlargement part 360 for increasing the magnitude of the DC voltage of horizontal size determining part 210 to enlarge the horizontal size in accordance with frame size enlargement signal Clt2 among the plurality of frame size variation signals.

Vertical size variable part 350 is formed by a vertical size reduction part 340 for reducing the magnitude of the DC voltage to decrease the vertical size in accordance with frame size reduction signal Clt1 among the plurality of frame size variation signals, and a vertical size enlargement part 380 for increasing the magnitude of the DC voltage of vertical size determining part 230 to enlarge the vertical size in accordance with frame size enlargement signal Clt2 among the plurality of frame size variation signals.

Figure 4:
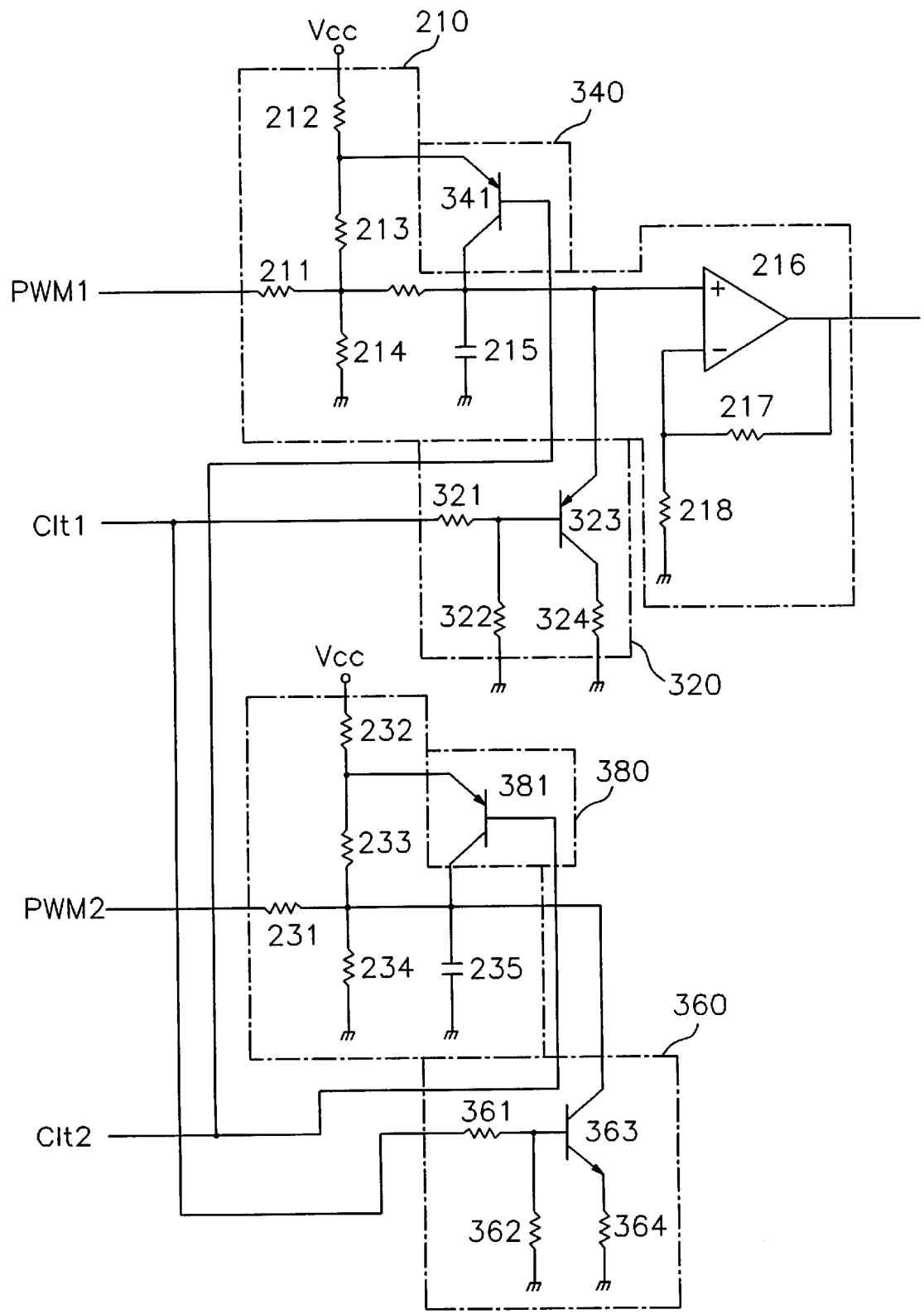
FIG. 4 is a view showing the construction of the frame size regulating circuit of FIG. 3 in detail.

Horizontal size determining part 210, as shown in FIG. 4, includes a plurality of resistors 211 to 214 and a capacitor 215 for shaping pulsewidth modulation signal PWM1 to provide the DC voltage, and an amplifier 216 for amplifying the DC voltage to provide the horizontal size determination signal of DC component. Also, resistors 217 and 218 are serially-connected between the output side of amplifier 216 and a ground for determining an amplification factor of amplifier 216.

Here, the construction of plurality of resistors 211 to 214 and capacitor 215 will be described in more detail. The output side of resistor 211 for biasing pulsewidth modulation signal PWM1 is connected with output sides of resistors 212, 213 and 214 which are serially-connected for distributing an external power source Vcc and overlapping a distribution voltage with biased pulsewidth modulation signal PWM1, and the output side of resistor 214 is grounded.

Output sides of resistors 211 and 213 are connected with one side of capacitor 215 which smooths an overlap signal to provide the DC voltage, and the other side of capacitor 215 is grounded. One side of capacitor 215 is connected to the (+) port of amplifier 216.

Meanwhile, vertical size determining part 230 is formed by a plurality of resistors 231 to 234 and a capacitor 235 identical to plurality of resistors 211 to 214 and capacitor 215 of horizontal size determining part 210.

Horizontal size reduction part 320 includes serially-connected resistors 321 and 322 for distributing frame size reduction signal Clt1, and a transistor 323 for switching to decrease the DC voltage of capacitor 215 in accordance with a distribution signal of resistors 321 and 322. In addition, a resistor 324 is provided for determining a quantity of output current of transistor 323.

The construction of horizontal size reduction part 320 will be described in more detail. That is, resistors 321 and 322 for distributing frame size reduction signal Clt1 are serially connected, and the output side of resistor 322 is grounded. The distribution signal of resistors 321 and 322 is connected to the base side of transistor 323. The collector side of transistor 323 is connected to one side of capacitor 215, and the emitter side of transistor 323 is connected to the input side of resistor 324. The output side of resistor 324 is grounded. Here, transistor 323 may adopt an NPN-type transistor, for example.

Horizontal size enlargement part 340 is formed by a transistor 341 for switching in accordance with frame size enlargement signal Clt2. The emitter side of transistor 341 is connected to the output side of resistor 212 of horizontal size determining part 210, and the collector side of transistor 341 is connected to one side of capacitor 215. Here, transistor 341 adopts a PNP-type transistor.

On the other hand, vertical size reduction part 360 is formed by a plurality of resistors 361, 362 and 364 and a transistor 363 identical to those of horizontal size reduction part 320, and vertical size enlargement part 380 is formed by a transistor 381 identical to horizontal size enlargement part 340.

The frame size regulating circuit according to the present invention as described above is operated and effected as follows.

Externally-supplied horizontal and vertical sync signals Hs and Vs are supplied to microprocessor 100. Then, microprocessor 100 generates pulsewidth modulation signals PWM1 and PWM2 corresponding to the frequencies of horizontal and vertical sync signals Hs and Vs so as to supply pulsewidth modulation signal PWM1 to horizontal size determining part 210 and pulsewidth modulation signal PWM2 to vertical size determining part 230.

Horizontal size determining part 210 shapes pulsewidth modulation signal PWM1 to provide the DC voltage, and amplifies the DC voltage to provide the horizontal size determination signal of DC component.

The operation of generating the horizontal size determination signal of DC component from pulsewidth modulation signal PWM1 will be described in detail with reference to FIG. 4. Pulsewidth modulation signal PWM1 is supplied to resistor 211 which in turn biases pulsewidth modulation signal PWM1.

Meantime, externally-supplied DC power source Vcc is supplied to resistors 212 and 213 and resistor 214, and resistors 212 and 213 and resistor 214 distribute DC power source Vcc. That is, DC power source Vcc is distributed by resistances of resistors 212 and 213 and of resistor 214.

The distribution voltage is supplied to capacitor 215 which smooths the distribution voltage to provide the DC voltage. Thereafter, the DC voltage is supplied to amplifier 215 which amplifies the input DC voltage to provide the horizontal size determination signal of DC component. At this time, the amplification factor of DC voltage is determined by resistors 217 and 218.

The horizontal size determination signal overlaps with a distortion correction signal which is received in the form of a parabola, and the overlap signal is supplied to an unshown diode modulation.

On the other hand, a procedure of generating the vertical size determination signal of DC component from pulsewidth modulation signal PWM2 is the same as of generating the DC voltage via resistors 211 to 214 and capacitor 215. Then, the vertical size determination signal of DC component is supplied to an unshown deflection circuit.

Meanwhile, once frame size reduction key K1 of key matrix 50 is selected, the key signal is supplied to microprocessor 100 which in turn scans the key signal and provides frame size reduction signal Clt1 in the level of high potential state.

Frame size reduction signal Clt1 is supplied to horizontal size reduction part 320, and horizontal size reduction part 320 decreases the magnitude of the horizontal size determination signal to reduce the horizontal size.

The procedure of decreasing the magnitude of the horizontal size determination signal so as to reduce the horizontal and vertical sizes of the frame will be described in more detail with reference to FIG. 4.

Frame size reduction signal Clt1 of high potential level is supplied to resistors 321 and 322, in which resistor 321 distributes frame size reduction signal Clt1 to provide the distribution voltage. Thereafter, the distribution voltage is supplied to transistor 323 to allow transistor 323 to switch in the turn-on state. Accordingly, the current flows from the collector side to the emitter side of transistor 323. At this time, the current amount flowing through transistor 323 is determined by the resistance of resistor 324.

Since the potential of the DC voltage of horizontal size determining part 210 is lowered due to the turn-on state of transistor 323, the horizontal size is reduced. The reduced quantity of the horizontal size is determined by the DC voltage of capacitor 215 and resistance of resistor 324.

Here, a procedure of reducing the vertical size in accordance with frame size reduction signal Clt1 of high potential level is the same as of reducing the horizontal size in accordance with frame size reduction signal Clt1.

Meantime, once frame size enlargement key K2 of key matrix 50 is selected, the key signal is supplied to microprocessor 100 which in turn scans the key signal and provides frame size enlargement signal Clt2 in the level of low potential state.

Frame size enlargement signal Clt2 is supplied to horizontal size enlargement part 360 and vertical size enlargement part 380. Thus, horizontal size enlargement part 360 increases the magnitude of the horizontal size determination signal to enlarge the horizontal size, and vertical size enlargement part 380 increases the magnitude of the vertical size determination signal to enlarge the vertical size.

The procedure of increasing the magnitudes of the horizontal size determination signal and vertical size determination signal to enlarge the horizontal and vertical sizes of the frame will be described in more detail with reference to FIG. 4.

When frame size enlargement signal Clt2 of low potential level is supplied to transistor 361 of horizontal size enlargement part 360, transistor 361 is switched under the turn-on state to supply the output current of resistor 322 in horizontal size determining part 210 to the collector side of transistor 361. Therefore, external power source Vcc is distributed by resistances of resistors 212 and 214.

The output signal of resistor 211 overlaps with distribution voltage of resistors 212 and 214, and the overlap signal is supplied to capacitor 215. Then, capacitor 215 smooths the overlap signal to provide the DC voltage. Since the DC voltage is to be greater than the initially-determined DC voltage in accordance with pulsewidth modulation signal PWM1, the horizontal size becomes enlarged. Here, the enlarged extent of the horizontal size is determined by resistances of resistors 211, 212 and 214.

A procedure of enlarging the vertical size is identical to that of enlarging the horizontal size.

When using the frame size regulating circuit of the monitor according to the present invention, the frame size can be enlarged or reduced by the key selection of a user. Furthermore, the vertical size and horizontal sizes are simultaneously regulated to enable to simply vary the frame size.

While the present invention has been particularly shown and described with reference to particular embodiment thereof, it will be understood by those skilled in the art that various changes in form and details may be effected therein without departing from the spirit and scope of the invention. For example, the transistor for performing the switching operation is of NPN type in the preferred embodiment, but it may be a PNP-type transistor.

What is claimed is:

1. A frame size regulating circuit comprising:
   a key matrix formed by a plurality of keys for varying horizontal and vertical sizes of a frame;
   a microprocessor for generating a plurality of pulsewidth modulation signals which determine the frame size in accordance with an externally-supplied horizontal sync signal and vertical sync signal, and scanning a key selected in said key matrix to generate a plurality of frame size variation signals;
   frame size determinator means for providing a horizontal size determination signal of DC component and a vertical size determination signal of DC component in accordance with said plurality of pulsewidth modulation signals, in which said frame size determinator means includes:
      a horizontal size determining means having
         $1^{st}$ through $3^{rd}$ resistors serially-connected for distributing a DC power source to provide a distribution voltage;
         a first capacitor for smoothing an overlap signal obtained by overlapping said distribution voltage of said $1^{st}$ through $3^{rd}$ resistors with said first pulsewidth modulation signal to provide said DC voltage;
         a first amplifier for amplifying said DC voltage to provide said horizontal size determination signal of DC component; and
         $4^{th}$ and $5^{th}$ resistors serially-connected between the output side of said first amplifier and a ground for determining an amplification factor of said first amplifier; and
      a vertical size determining means for shaping the second pulsewidth modulation signal among said plurality of pulsewidth modulation signals to generate a DC voltage, and providing said DC voltage as said vertical size determination signal of DC component; and
   frame size variable means for varying magnitude of said horizontal size determination signal of DC component and of said vertical size determination signal of DC component in accordance with said plurality of frame size variation signals to vary the size of said frame.

2. The frame size regulating circuit as claimed in claim 1, wherein said frame size variable means comprises:
   horizontal size variable means for regulating the magnitude of said DC voltage from said horizontal size determining means in accordance with said plurality of frame size variation signals to vary said horizontal size; and
   vertical size variable means for regulating the magnitude of said DC voltage from said vertical size determining means in accordance with said plurality of frame size variation signals to vary said vertical size.

3. The frame size regulating circuit as claimed in claim 2, wherein said horizontal size variable means comprises:
   horizontal size reduction means for decreasing the magnitude of said DC voltage from said horizontal size determining means in accordance with a frame size reduction signal among said plurality of frame size variation signals to reduce said horizontal size; and
   horizontal size enlargement means for increasing the magnitude of said DC voltage from said horizontal size determining means in accordance with a frame size enlargement signal among said plurality of frame size variation signal to enlarge said horizontal size.

4. The frame size regulating circuit as claimed in claim 3, wherein said vertical size variable means comprises:
   vertical size reduction means for decreasing the magnitude of said DC voltage from said vertical size determining means in accordance with the frame size reduction signal among said plurality of frame size variation signals to reduce said vertical size; and
   vertical size enlargement means for increasing the magnitude of said DC voltage from said vertical size determining means in accordance with the frame size enlargement signal among said plurality of frame size variation signal to enlarge said vertical size.

5. A frame size regulating circuit comprising:
   a key matrix formed by a plurality of keys for varying horizontal and vertical sizes of a frame;
   a microprocessor for generating a plurality of pulsewidth modulation signals which determine the frame size in accordance with an externally-supplied horizontal sync signal and vertical sync signal, and scanning a key selected in said key matrix to generate a plurality of frame size variation signals;
   frame size determinator means for providing a horizontal size determination signal of DC component in accordance with said plurality of pulsewidth modulation signals, in which said frame size determinator means includes:
      horizontal size determining means for shaping the first pulsewidth modulation signal among said plurality of pulsewidth modulation signals to generate a DC voltage, and amplifying said DC voltage to provide said horizontal size determination signal of DC component; and
      a vertical size determining means for shaping the second pulsewidth modulation signal among said plurality of pulsewidth modulation signals to generate a DC voltage, and providing said DC voltage as said vertical size determination signal of DC component comprising:
         $1^{st}$ through $3^{rd}$ resistors serially-connected for distributing a DC power source to provide a distribution voltage; and
         a first capacitor for smoothing an overlap signal obtained by overlapping said distribution voltage of said $1^{st}$ through $3^{rd}$ resistors with said second pulsewidth modulation signal to provide said DC voltage; and
   frame size variable means for varying magnitude of said horizontal size determination signal of DC component and of said vertical size determination signal of DC component in accordance with said plurality of frame size variation signals to vary the size of said frame.

6. A frame size regulating circuit comprising:

a key matrix formed by a plurality of keys for simultaneously varying horizontal and vertical sizes of a frame;

a microprocessor for generating a plurality of pulsewidth modulation signals which determine the frame size in accordance with an externally-supplied horizontal sync signal and vertical sync signal, and scanning a key selected in said key matrix to generate a plurality of frame size variation signals;

frame size determinator means for providing a horizontal size determination signal of DC component and a vertical size determination signal of DC component in accordance with said plurality of pulsewidth modulation signals;

horizontal size reduction means for decreasing the magnitude of a DC voltage from a horizontal size determinator means in accordance with a frame size reduction signal among a plurality of frame size variation signals to reduce the horizontal size, wherein said horizontal size reduction means includes;

$1^{st}$ and $2^{nd}$ resistors serially-connected for distributing said frame size reduction signal;

a first transistor for switching in accordance with the distribution voltage of said $1^{st}$ and $2^{nd}$ resistors to decrease said DC voltage; and a $3^{rd}$ resistor for determining a quantity of output current of said first transistor;

horizontal size enlargement means for increasing the magnitude of said DC voltage from said horizontal size determinator means in accordance with a frame size enlargement signal among said plurality of frame size variation signals to enlarge the horizontal size;

vertical size reduction means for decreasing the magnitude of a DC voltage from a vertical size determinator means in accordance with said frame size reduction signal among said plurality of frame size variation signals to reduce the vertical size; and vertical size enlargement means for increasing the magnitude of said DC voltage from said vertical size determinator means in accordance with said frame size enlargement signal among said plurality of frame size variation signals to enlarge the horizontal size.

7. The frame size regulating circuit as claimed in claim 6, wherein said first transistor is of an NPN type which switches in the turn-on state when an input signal of the base side is of a high potential level.

8. The frame size regulating circuit as claimed in claim 6, wherein said horizontal size enlargement means is comprised of a first transistor which switches in accordance with said frame size enlargement signal.

9. The frame size regulating circuit as claimed in claim 8, wherein said second transistor is of PNP type which switches in the turn-on state when an input signal of the base side of said second transistor is of a low potential state.

10. The frame size regulating circuit as claimed in claim 6, wherein said vertical size reduction means comprises:

$4^{th}$ and $5^{th}$ resistors serially-connected for distributing said frame size reduction signal;

a third transistor switching in accordance with the distribution signal of said $12^{th}$ and $6^{th}$ resistors for decreasing said DC voltage of said second capacitor; and a $14^{th}$ resistor for determining a quantity of output current of said third transistor.

11. The frame size regulating circuit as claimed in claim 6, wherein said vertical size enlargement means is comprised of a second transistor switching in accordance with said frame size enlargement signal.

* * * * *